(12) United States Patent
Pelka

(10) Patent No.: US 11,110,824 B2
(45) Date of Patent: Sep. 7, 2021

(54) GUIDE DEVICE FOR GUIDING AN ADJUSTMENT MOVEMENT OF A VEHICLE SEAT

(71) Applicant: GRAMMER AG, Amberg (DE)

(72) Inventor: Joachim Pelka, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/797,413

(22) Filed: Feb. 21, 2020

(65) Prior Publication Data

US 2020/0269728 A1 Aug. 27, 2020

(30) Foreign Application Priority Data

Feb. 22, 2019 (DE) .......................... 102019104530.4

(51) Int. Cl.
*B60N 2/08* (2006.01)

(52) U.S. Cl.
CPC ...................................... *B60N 2/08* (2013.01)

(58) Field of Classification Search
CPC ... B60N 2/08; B60N 2/07; B60N 2/06; B60N 2/04
USPC ....................................................... 297/344.1
See application file for complete search history.

(56) References Cited

U.S. PATENT DOCUMENTS

| | | | | |
|---|---|---|---|---|
| 2015/0151650 A1* | 6/2015 | Kim | ....................... | B60N 2/123 248/429 |
| 2017/0334319 A1* | 11/2017 | Sprenger | .............. | B60N 2/0887 |
| 2018/0251045 A1* | 9/2018 | Brewer | ................... | B60N 2/682 |
| 2019/0184859 A1* | 6/2019 | Flick | ..................... | B60N 2/0875 |
| 2019/0225119 A1* | 7/2019 | Nish Io | ..................... | B60N 2/08 |
| 2019/0232833 A1* | 8/2019 | Emrich | ..................... | B60N 2/43 |
| 2020/0391619 A1* | 12/2020 | Krpo | ..................... | B60N 2/0715 |

FOREIGN PATENT DOCUMENTS

| | | |
|---|---|---|
| DE | 19804506 | 8/1999 |
| DE | 102011001740 | 3/2012 |
| DE | 202008018315 | 11/2012 |
| DE | 202016001836 | 6/2017 |

OTHER PUBLICATIONS

Official Action for German Patent Application No. 102019104530. 4, dated Nov. 6, 2019, 3 pages.

* cited by examiner

*Primary Examiner* — Mark R Wendell
(74) *Attorney, Agent, or Firm* — Sheridan Ross P.C.

(57) ABSTRACT

The invention relates to a guide device for guiding an adjustment movement of a vehicle seat, comprising a guide rail device and a slide rail device arranged to be displaceable in a longitudinal adjustment direction of the guide device, the slide rail device having a first stop element and a second stop element, an integral component being arranged between the slide rail device and the guide rail device which is divided into a first and a second section in the longitudinal direction of the guide device, the component being fixedly connected to the guide rail device by means of at least one connection element arranged in the first section, the second section of the component having at a first end a first stop element for one of the stop elements of the slide rail device and at a second end a second stop element for the other of the stop elements of the slide rail device.

20 Claims, 6 Drawing Sheets

GUIDE DEVICE FOR GUIDING AN ADJUSTMENT MOVEMENT OF A VEHICLE SEAT

CROSS-REFERENCE TO RELATED APPLICATIONS

This application claims the benefit of German Patent Application No. DE 102019104530.4 filed Feb. 22, 2019, the entire disclosure of which is incorporated herein by reference in its entirety.

FIELD

The invention relates to a guide device for guiding an adjustment movement of a vehicle seat according to the preamble of claim 1.

For example, this adjustment movement constitutes the displacement of elements which are mounted on plain bearings or ball bearings relative to one another by means of rail devices, that is to say, for example, an upper seat part relative to a lower seat part, an upper armrest part relative to a lower armrest part or a headrest part relative to a backrest. These guide devices offer the user of a vehicle seat the possibility of adapting the position of the displaceable part or of the entire seat depending on the size of the user, on the ratio of the leg length to the torso length and on his personal comfort, by displacing the part or the seat, starting from a basic position, in a first direction, for example forwards, or in a second direction which is preferably opposite to the first direction, that is to say for example backwards, and locking it in an adapted position. Corresponding locking devices are known from the prior art and are therefore not explained in detail in the scope of the present invention.

BACKGROUND

Known rail devices have a guide rail device and a slide rail device which is adjustable with respect thereto. When the two rail devices are displaced to a maximum extent relative to each other in the first adjustment direction, a first standard stop element of the guide rail device forms a mechanical interaction with a first standard stop element of the slide rail device, so that a further displacement in this direction is not possible. Analogously, when the two rail devices are displaced to a maximum extent relative to each other in the second adjustment direction, a second standard stop element of the guide rail device forms a mechanical interaction with a second standard stop element of the slide rail device, so that a further displacement in this direction is likewise not possible.

However, in addition to the proportions of the driver and the desired comfort, the space available in the vehicle also plays a role. Thus, for example, a vehicle seat can be positioned so far forward in the vehicle by a maximum adjustment forwards that a very tall driver hits his knees on the steering wheel. Furthermore, it is possible, for example, for components of such a vehicle seat to collide with one or more windows of the vehicle in the event of a maximum adjustment towards the rear. This is possible in particular if the driver's cab of this vehicle is very narrow, such as a driver's cab of an excavator.

Therefore, in the case of vehicle seats it makes sense to design the maximum adjustment path in the possible adjustment directions so that it can be limited individually.

Bought-in parts, which are produced in large quantities and can therefore be bought cheaply, are often used in vehicle construction, especially for rail equipment. Therefore, an individual change in the design or the configuration of these rail devices to ensure the limitation of the adjustment path is not provided in the calculation of the sales price and would make the vehicle seat or the vehicle itself excessively expensive.

It is therefore more practical to design the adjustment device of a vehicle seat so that the maximum adjustment path can be individually limited in one or both directions in such a way that a standard assembly can still be used for the guide device, but this is simply supplemented by suitable apparatuses.

For this purpose, it is known from the prior art to provide a component which is installed in the guide device and limits the displacement in the first direction. In addition, however, a second component is necessary, which is likewise installed in the guide device and limits the displacement in the second direction. It goes without saying that this solution with two components involves a lot of assembly work and therefore drives up the costs.

SUMMARY

It is therefore an object of the present invention to provide a guide device which has the possibility of individually limiting the maximum adjustment path of the two rail devices with respect to one another in both directions, and the preassembly of which is easy to accomplish.

Accordingly, a guide device for guiding an adjustment movement of a vehicle seat is proposed, comprising a guide rail device and a slide rail device arranged displaceably thereto in a longitudinal adjustment direction of the guide device, the slide rail device having a first stop element and a second stop element. Furthermore, a one-piece component, which is divided into a first and a second section in the longitudinal direction of the guide device, is arranged between the slide rail device and the guide rail device, the component being fixedly connected to the guide rail device by means of at least one connection element arranged in the first section. According to the invention, the second section of the component forms a first stop element for one of the stop elements of the slide rail device at a first end and a second stop element for the other stop element of the slide rail device at a second end.

The guide rail device and the associated slide rail device are preferably ball rail devices in the sense of linear rails mounted on ball bearings with respect to one another, so that a ball rail guide unit is provided overall. This embodiment is particularly suitable for a low-friction relative movement of the two rails.

The rest of the guide device is preferably already a complete assembly and/or fully functional with respect to the relative movement of the two rail devices even without a component inserted. Thus, the component is preferably not designed as part of the guide rail device and/or the slide rail device, but preferably independently thereof.

The arranged component ensures, on the one hand, that slide rail devices and guide rail devices installed as standard can continue to be used for the guide device. On the other hand, the component can advantageously be retrofitted, so that a quick and inexpensive solution for changing the limitation of the adjustment paths can be provided in particular when a change of driver is imminent or the customer requirements are still changing afterwards. In particular, the component can be retrofitted into the rest of the already pre-assembled guide device.

The component is preferably designed such that to insert the component ("threading") into the guide device, the component only undergoes translation in the longitudinal direction of the guide device and rotation about an axis in the width direction of the guide device.

However, the stop elements of the slide rail device advantageously do not constitute the standard stop elements which, in conjunction with the stop elements of the guide rail device, are responsible for limiting the adjustment paths without an insertable component.

For better distinction, in the event that no component is inserted into the guide device, the interacting stop elements of the slide rail device and guide rail device are designated as "standard stop elements". Analogously, in the event that a component is inserted into the guide device, the interacting stop elements of the slide rail device and the component are referred to as "stop elements".

The stop elements of the slide rail device which can interact with the stop elements of the component are also advantageously part of the standard guide device and, for example, designed as part of screw connections. The screw connections are advantageously provided for connecting the slide rail device to an upper part to be displaced.

According to a preferred embodiment, the standard stop elements of the slide rail device and of the guide rail device are arranged such that they are arranged centrally or on both sides symmetrically with respect to the central axis of the guide device in the width direction of the guide device. This ensures that the rail devices cannot easily tilt when the standard stop elements are attached. At the same time, safe and mechanically stable guidance and limitation of the adjustment paths should be assumed.

The arrangement of the standard stop elements ensures that only the same standard stop elements can interact with one another. The guide device is now considered without an insertable component. It is therefore ruled out, for example, that a standard stop element of the guide rail device which is responsible for limiting the adjustment path in the first direction interacts with a standard stop element of the slide rail device which is responsible for limiting the adjustment path in the second direction. The same naturally applies to the reverse case. All standard stop elements belonging to the guide device are therefore preferably arranged one behind the other, as seen in the longitudinal direction of the guide device.

For example, viewed in the longitudinal direction of the guide device, the standard stop elements of the guide rail device which limit the adjustment path in the first direction are arranged in a first end region of the guide rail device, whereas, for example, the standard stop elements which limit the adjustment path in the second direction are arranged in a second end region of the guide rail device.

Analogously to this, viewed in the longitudinal direction of the guide device, the standard stop elements of the slide rail device which limit the adjustment path in the first direction are arranged in a first central region, whereas, for example, the standard stop elements which limit the adjustment path in the second direction are arranged in a second central region.

The standard stop elements belonging to the guide rail device from the first end region can interact with the standard stop elements belonging to the slide rail device from the first central region. Analogously to this, the standard stop elements belonging to the guide rail device from the second end region can interact with the standard stop elements belonging to the slide rail device from the second middle region; at least when no component according to claim 1 is used.

The component arranged thus takes over the limitation of the adjustment path in the first direction and at the same time in the second direction. In addition, it can be mechanically securely installed in the guide rail via the connection element in the first section, which is designed as part of the component, for example as a recess in the component and preferably as a through hole.

For the purposes of the present invention, the stop elements of the slide rail device are preferably designed as mechanical stop elements which are arranged so as to protrude into an installation space which is preferably designed as an intermediate space between a slide rail element of the slide rail device and a guide rail element of the guide rail device.

The component preferably comprises precisely one first section and precisely one second section. The component is preferably otherwise free of further sections.

According to a preferred embodiment, the component has exactly one mirror symmetry plane, which is preferably arranged parallel to the longitudinal direction of the guide device. The component is therefore simply designed; it can be installed intuitively within the guide device, since the arrangement of the plane of mirror symmetry in relation to the longitudinal direction of the guide device is self-explanatory. In addition, the mirror symmetry plane and its arrangement parallel to the longitudinal direction of the guide device ensure that there are two possible ways of installing the component. These two options and the resulting installation states are explained in more detail below.

A longitudinal direction of the component is preferably arranged parallel to the longitudinal direction of the guide device in at least one, preferably in both of its states installed in the guide device. The same preferably applies to a width direction of the component in relation to the width direction of the guide device and to a height direction of the component in relation to the height direction of the guide device. The component is preferably arranged centrally with respect to a width direction of the guide device, so that it is arranged centrally relative to the width of the guide rail device, the guide rail element, the slide rail device and/or the slide rail element.

In addition, it is preferred if the component as a whole has a simple design. For example, it is preferred that the component has a homogeneous thickness over its entire length and/or width. Provision can also be made for the first section of the component to be linear when viewed in the longitudinal direction.

It is of course conceivable that different components are provided, which differ with regard to the length of the first and/or the second section. The right component is then selected and used depending on the customer's requirements.

Furthermore, it can be provided that the second section of the component, which is preferably arranged directly adjacent to the first section, has a U shape. This U shape is preferably designed with respect to the longitudinal direction of the component.

The length of the component preferably extends in the longitudinal direction of the component. The width of the component preferably extends in the width direction of the component. The thickness of the component preferably extends at least in sections in the vertical direction of the component.

In the context of the present invention, "U shape" is understood to mean that the element, in this case the second section, has a central linear portion and that two portions perpendicular to it are arranged directly adjacent to the central portion.

The second section may optionally have rounded sections which form the corners of the U shape and/or the connection point to the first section.

A vertical portion or a rounded portion or a vertical portion together with a rounded portion each preferably form a stop element of the second section of the component.

The component can in particular be designed as a sheet metal part, the manufacture of which in terms of shape only comprises the production of the blank from a metal sheet and the folding of the blank. Afterwards, surface-treating or finishing steps such as galvanizing or powder coating are possible.

The component therefore preferably only has tabs which are folded relative to one another ("folds"), preferably only four, as production elements. The component is therefore preferably free of further production elements such as folds, envelopes, standing seams, beads, gills, threaded bores, weld seams and/or deep-drawn bodies.

In order to further reduce the costs, it is advantageous if a total of two differently sized limits of the adjustment path can be implemented per guide device by means of a single component.

According to a further preferred embodiment, it is accordingly provided that the longitudinal adjustment direction of the guide device is a direction towards the front and/or a direction towards the rear. There is preferably at least a first and at least a second installation state of the component. For example, according to the first installation state with respect to the longitudinal adjustment direction to the front, the first section of the component is arranged in front of the second section. For example, according to the second installation state with respect to the longitudinal adjustment direction to the front, the first section of the component is arranged behind the second section.

It goes without saying that "front" and "rear" represent directions which relate to the guide device. These directions can also correspond to the directions of the entire seat or an upper part of the seat, but do not have to.

The component can thus have two orientations with respect to the longitudinal adjustment direction of the guide device, which are rotated by 180° with respect to one another. The orientations relative to one another are preferably rotated through 180° with respect to an axis in the height direction of the guide device. The relative position of the second section of the component with respect to the rest of the guide device and thus to the stop elements preferably differs from the first to the second installation state. Thus it is possible to implement two adjustment paths of different sizes with a single component per guide device.

It is advantageous if, in each installation state, the position of the component can be adjusted again at least in stages, in order to realise further adjustment possibilities. For example, it is preferred that the component has at least one, preferably a plurality of recesses in the first section, wherein it can be connected to at least one fastening element of the guide rail device by means of at least one of the recesses. For example, these recesses are arranged in succession in the longitudinal direction of the component. The distance between the recesses can in each case be identical or different.

The component can preferably be installed in the guide rail device in accordance with both installation states, wherein it is possible to choose between one or more, preferably between all, recesses of the component per installation state for the formation of the connection element to the guide rail device.

It is also advantageous if the position of the component is infinitely adjustable in each installation state. For example, it is conceivable that at least one of the recesses is designed as an elongated hole.

Apart from the recess or recesses of the first section, the component is preferably otherwise free of further recesses. This increases the stability of the component.

The width of the component is preferably designed such that it does not change over its length and/or height or only changes in the first section. In order to provide enough space ("meat") for the assembly of the component within the guide device and the provision of the recess provided therefor, and at the same time to ensure that the component is lightweight, it may be advantageous if the component in the first section has a tapering width oriented towards the second section. The recess or the recesses is/are preferably arranged in a wider part of the first section and/or not in the narrower part of the first section.

Furthermore, it may be advantageous if the component has a homogeneous width in the second section. Furthermore, it may be advantageous if the component in the second section has an end section which widens relative to the remaining width of the second section. This increases the stability of the component.

In order to ensure secure assembly of the component within the guide rail device and at the same time the unimpeded displacement of the slide rail device relative to the guide rail device, it is preferable that the component is designed to make direct contact with a guide rail element of the guide rail device and/or to be spaced apart from a slide rail element of the slide rail device. It is preferred that the stop elements of the slide rail device are the only elements of the guide device with which the stop elements of the component can interact when the slide rail device is adjusted relative to the guide rail device.

Such a guide device could be arranged on a vehicle seat and/or within a vehicle, for example, such that the longitudinal adjustment direction of the guide device can be arranged parallel to a longitudinal direction of the vehicle seat and/or the lower part of the vehicle seat, and that the guide rail device is fixedly connected to the lower part of the vehicle seat and the slide rail device is fixedly connected to an upper part of the vehicle seat.

BRIEF DESCRIPTION OF THE DRAWINGS

Further advantages, aims and properties of the present invention are described with reference to the accompanying drawings and the following description, in which embodiments of the used component and of the guide device according to the invention are shown and described by way of example. In the drawings:

FIG. 5b shows an enlarged view of FIG. 5a.

DETAILED DESCRIPTION

Figure 4A:
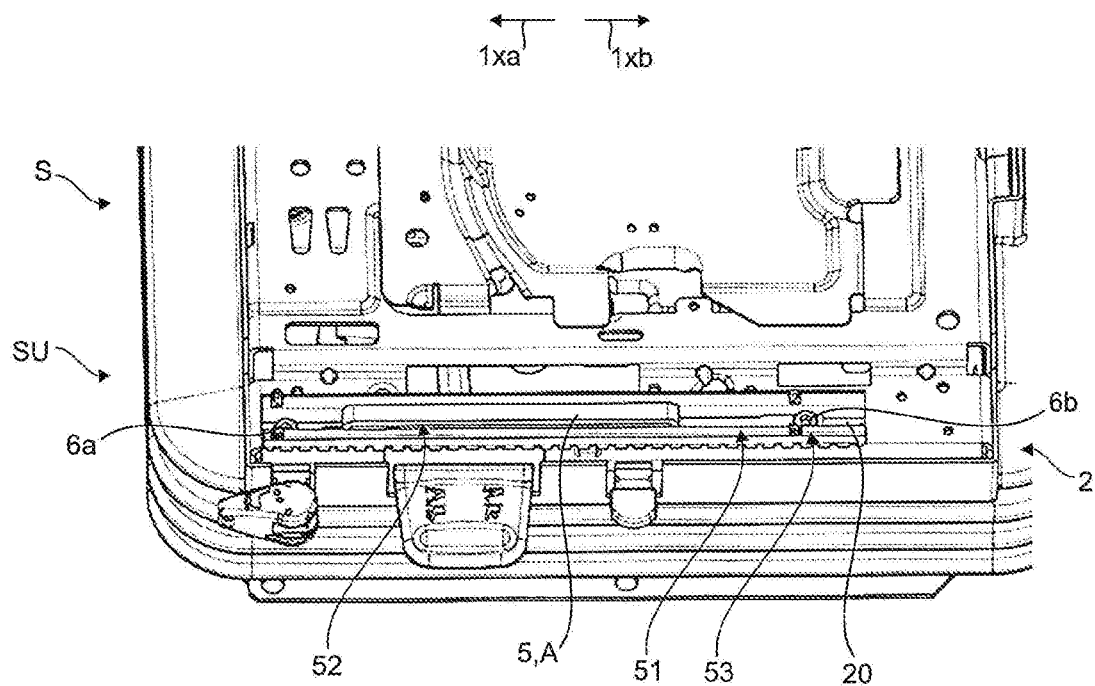
FIG. 4a shows an oblique view of the assembly of FIG. 2c.
Figure 4B:
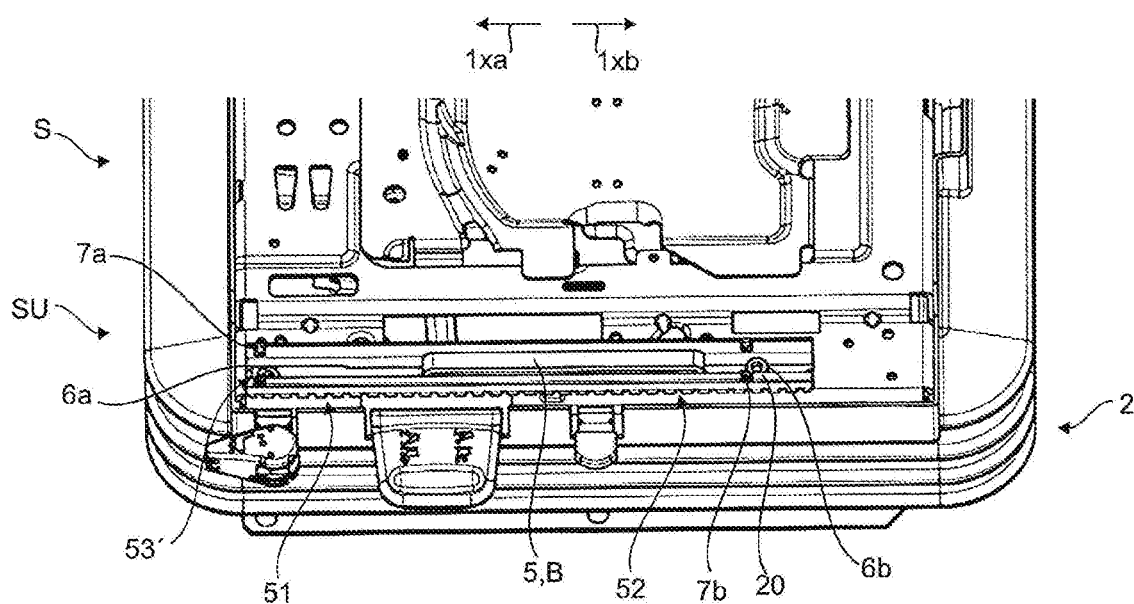
FIG. 4b shows an oblique view of the assembly of FIG. 3c.

It should be mentioned that parts have been omitted from the drawings for better clarity. For example, FIGS. 4a and 4b show only a lower part SU of a vehicle seat S and FIG. 5a does not show the entire vehicle seat S, but only parts thereof. FIG. 1d shows only parts of the guide device 1 and in particular not the guide rail device 2 of the guide device 1.

The invention is described below on the basis of a guide device 1 for guiding an adjustment movement of a vehicle seat S, wherein the adjustment movement represents, for example, the displacement of an upper seat part SO relative to a lower seat part SU. For this purpose, as shown here, the upper seat part SO is fixedly connected to the slide rail device 3 and the lower seat part SU is connected fixedly to the guide rail device 2.

Parts of a vehicle seat S are shown, for example, with reference to FIGS. 2a-c, 3a-c and 5a, 5b, wherein a guide device 1 is shown with the guide rail device 2 and the slide rail device 3 which can be adjusted for this purpose.

Figure 5A:
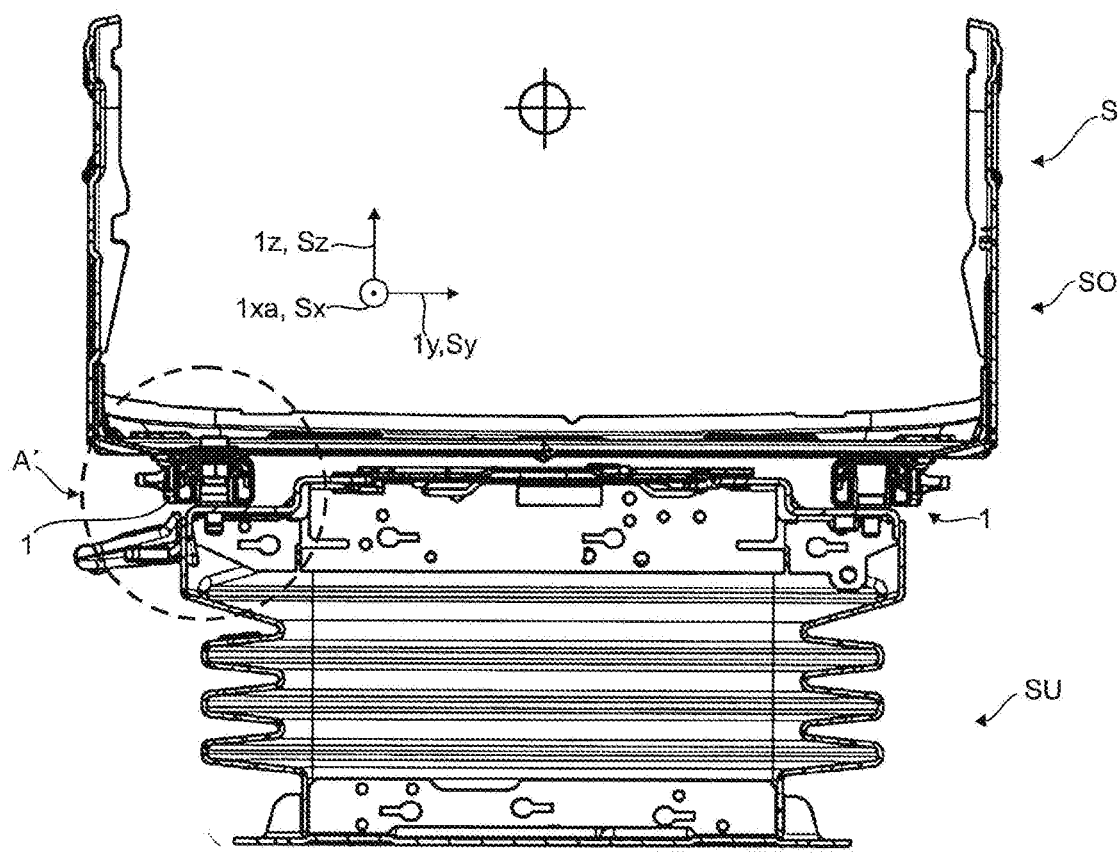
FIG. 5a shows a front view of parts of a vehicle seat with a guide device according to the invention.

A co-ordinate system in FIG. 5a illustrates the orientation of the longitudinal direction 1xa of the guide device 1 towards the front, the width direction 1y of the guide device 1 towards the right and the height direction 1z of the guide device 1 towards the top. In the present case, the guide device 1 is arranged within the vehicle seat S such that the longitudinal direction 1xa of the guide device 1 corresponds to the seat longitudinal direction Sx, the width direction 1y of the guide device 1 corresponds to the seat width direction Sy and the height direction 1z corresponds to the seat height direction Sz.

Figure 5B:
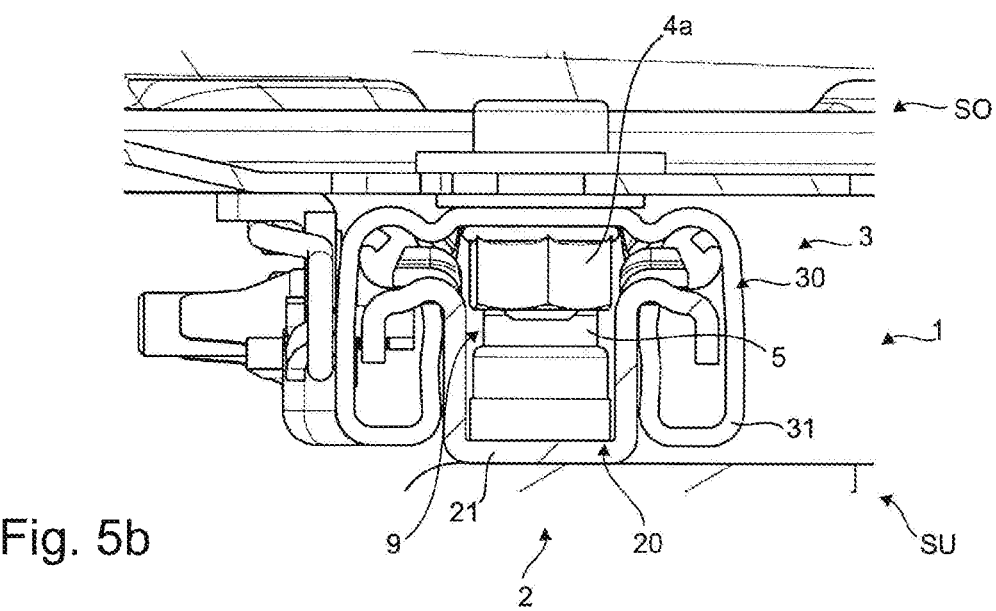

According to FIGS. 5a and 5b, the slide rail device 3 is arranged in a basic position, according to which the slide rail device 3 and the guide rail device 2 are not displaced relative to one another. In particular, according to this basic position, end faces of the slide rail element 30 and the guide rail element 20 which are oriented identically are arranged at the same position with respect to the longitudinal direction 1x of the guide device 1. FIG. 5b shows an enlargement of a section A' according to FIG. 5a.

When the two rail devices 2, 3 are displaced to a maximum extent relative to one another in the first adjustment direction 1xa, a first standard stop element 7a of the guide rail device 2 forms a mechanical interaction with a first standard stop element 8a of the slide rail device 3, so that a further displacement in this direction 1xa is not possible. This case applies if no component 5 is inserted into the guide device 1.

Analogously, when the two rail devices 2, 3 are displaced to a maximum extent relative to one another in the second adjustment direction 1xb, a second standard stop element 7b of the guide rail device 2 forms a mechanical interaction with a second standard stop element 8b of the slide rail device 3, so that a further displacement in this direction 1xb is likewise not possible. In the present case, the standard stop elements 7a, 7b, 8a, 8b are each configured as "lugs", that is to say as folded tabs of a guide rail element 20 of the guide rail device 2 and of a slide rail element 30 of the slide rail device 3. This case also applies if no component 5 is inserted into the guide device 1.

Figure 2A:
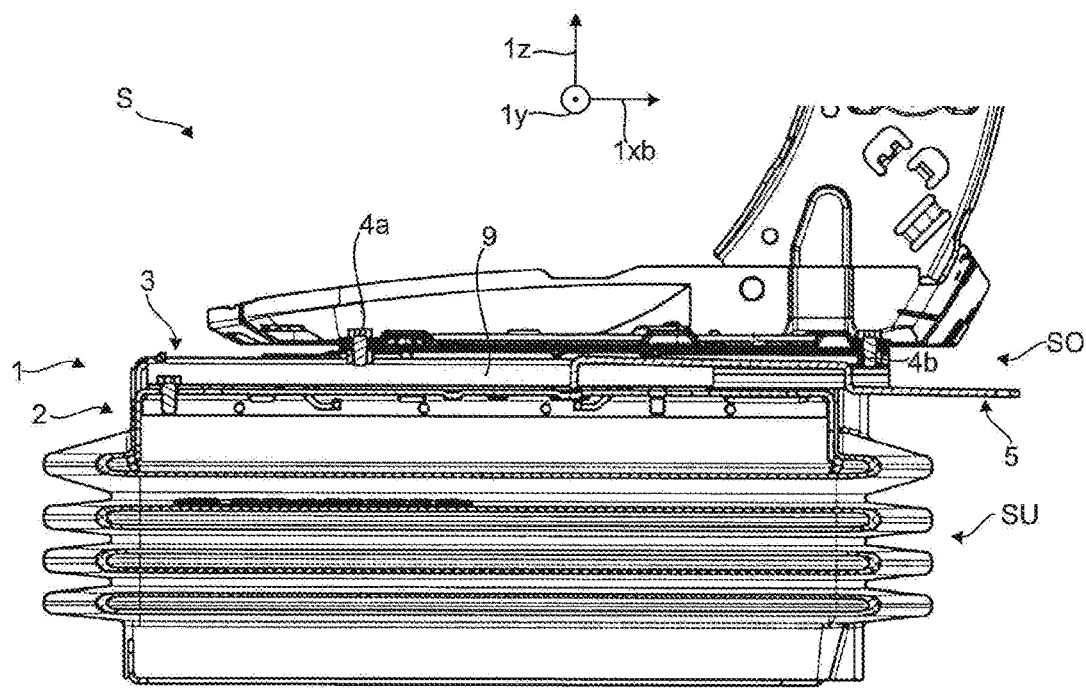
FIG. 2a-c shows different stages of an assembly process of the component from FIG. 1a in a guide device, so that the component is assembled in accordance with a first installation state.
Figure 2B:
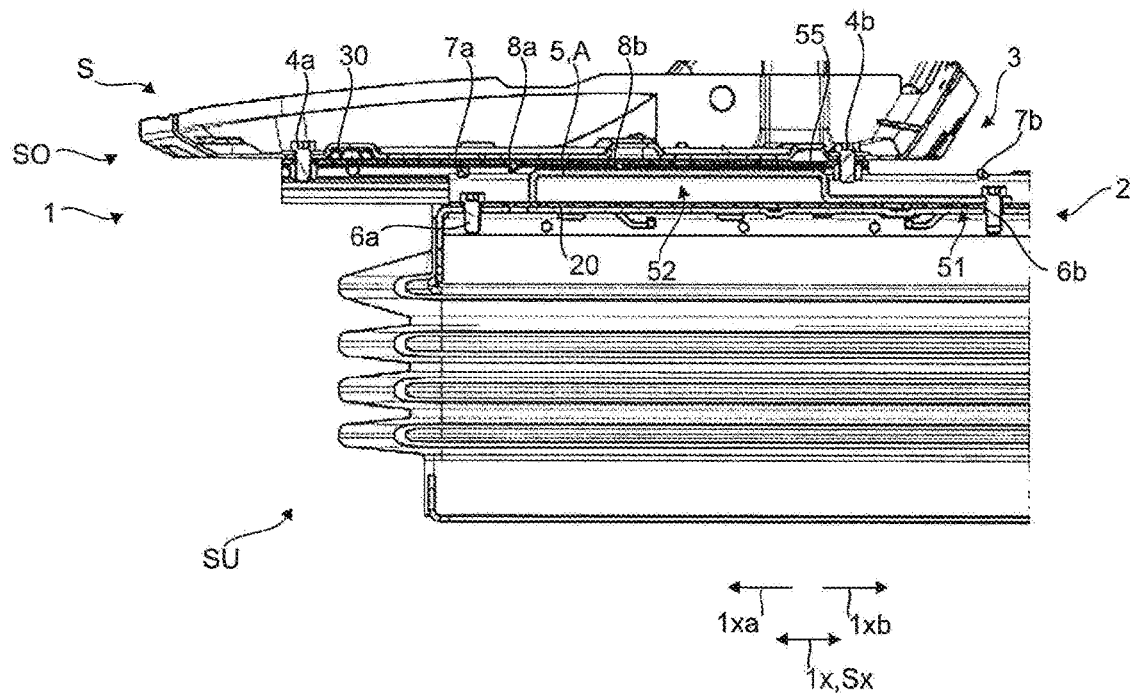

In particular in accordance with FIG. 2b, a guide device 1 is shown for guiding an adjustment movement of a vehicle seat S, comprising a guide rail device 2 and a slide rail device 3 arranged displaceably in a longitudinal adjustment direction 1x of the guide device 1, wherein the slide rail device 3 comprises a first stop element 4a and a second stop element 4b. Likewise, a one-piece component 5 is arranged between the slide rail device 3 and the guide rail device 2, and is subdivided in the longitudinal direction 1x of the guide device 1, which in the present case corresponds to the longitudinal direction of the component 5, into a first section 51 and a second section 52. The component 5 is fixedly connected to the guide rail device 2 by means of a connection element 53 arranged in the first section 51, in the present case by means of the fastening element 6b of the guide rail device 2.

The second section 52 of the component 5 forms a first stop element 54 for the first stop element 4a of the slide rail device 3 at a first end 52a and a second stop element 55 for the second stop element 4b of the slide rail device 3 at a second end 52b. According to FIG. 3c, the second section 52 of the component 5 forms a first stop element 54 for the second stop element 4b of the slide rail device 3 at the first end 52a and a second stop element 55 for the first stop element 4a of the slide rail device 3 at a second end 52b.

In the present case, the component 5 is not designed as part of the guide rail device 2 and/or the slide rail device 3, but independently of it. According to FIG. 1d, a view of the guide device 1 from below, that is to say parallel to the height direction 1z, is shown, the guide rail device 2 being hidden for better clarity. In the present case, the component 5 is arranged centrally with respect to a width direction 1y of the guide device 1, so that it is arranged centrally with respect to the width of the guide rail device 2, the guide rail element 20, the slide rail device 3 and the slide rail element 30.

In the present case, the component 5 is designed such that for insertion of the component 5 ("threading") into the guide device 1, the component 5 only undergoes a translation in the longitudinal direction 1x of the guide device 1 and a rotation about an axis in the width direction 1y of the guide device 1.

Figure 2C:
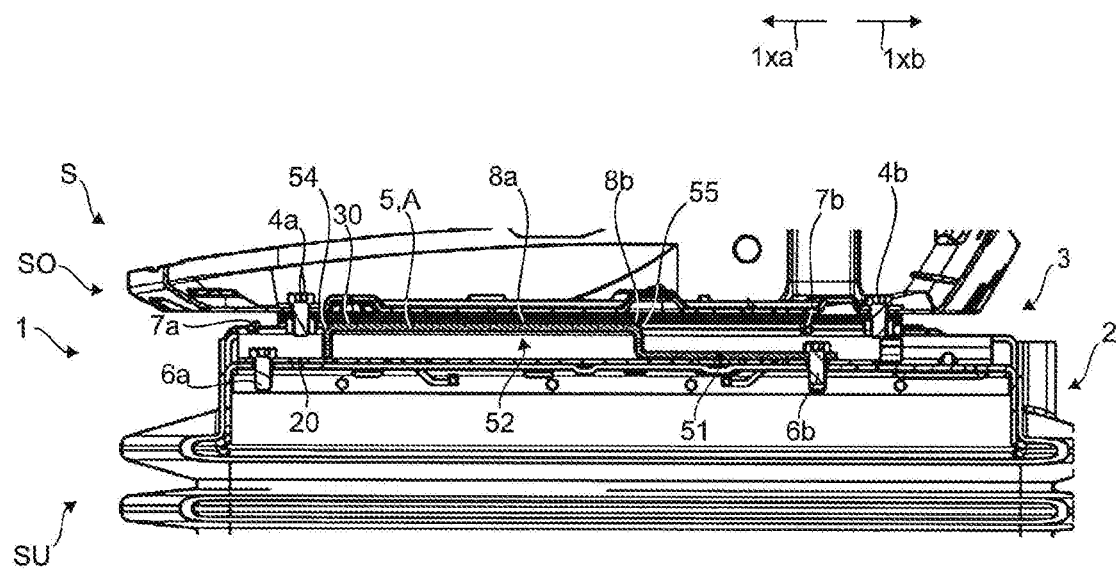

FIG. 2a-c show different steps in chronological order of threading the component 5 into the rest of the guide device 1, so that the component 5 is installed according to a first installation state A.

According to FIG. 2a, a first step of threading can be seen. Accordingly, the slide rail device 3 and with it the upper seat part SO is displaced to a maximum extent relative to the guide rail device 2 and the lower seat part SU towards the rear 1xb. This ensures that the rear stop element 4b of the slide rail device 3 does not collide with the component 5 when threading the component 5. The component 5 is now pushed from the rear seat side in the longitudinal direction towards the front 1xa with the second section 52 first into the installation space 9.

According to FIG. 2b, the component 5 has already reached its intended position within the rest of the guide device 1. The slide rail device 3 is now moved forwards 1xa to a maximum extent so that the access to the fastening element 6b of the guide rail device 2 necessary for fastening the component 5 within the remainder of the guide device 1 is ensured. The component 5 is fastened to the lower seat part SU via the guide rail device 2 by means of the fastening element 6b and the connection element 53. FIG. 2c shows the state in which the guide device 1 is complete and the assembly of the component 5 has ended.

By means of the component 5 shown, however, a total of two differently sized limitations of the adjustment path can be implemented.

Figure 3A:
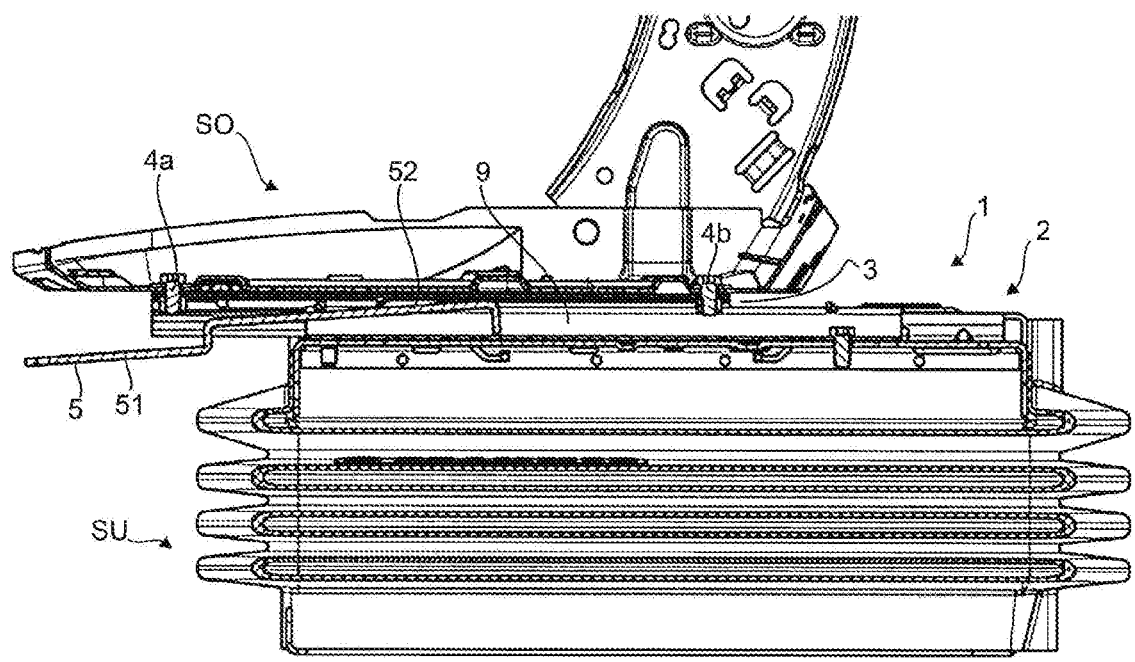
FIG. 3a-c show different stages of an assembly process of the component from FIG. 1a in a guide device, so that the component is assembled according to a second installation state.
Figure 3B:
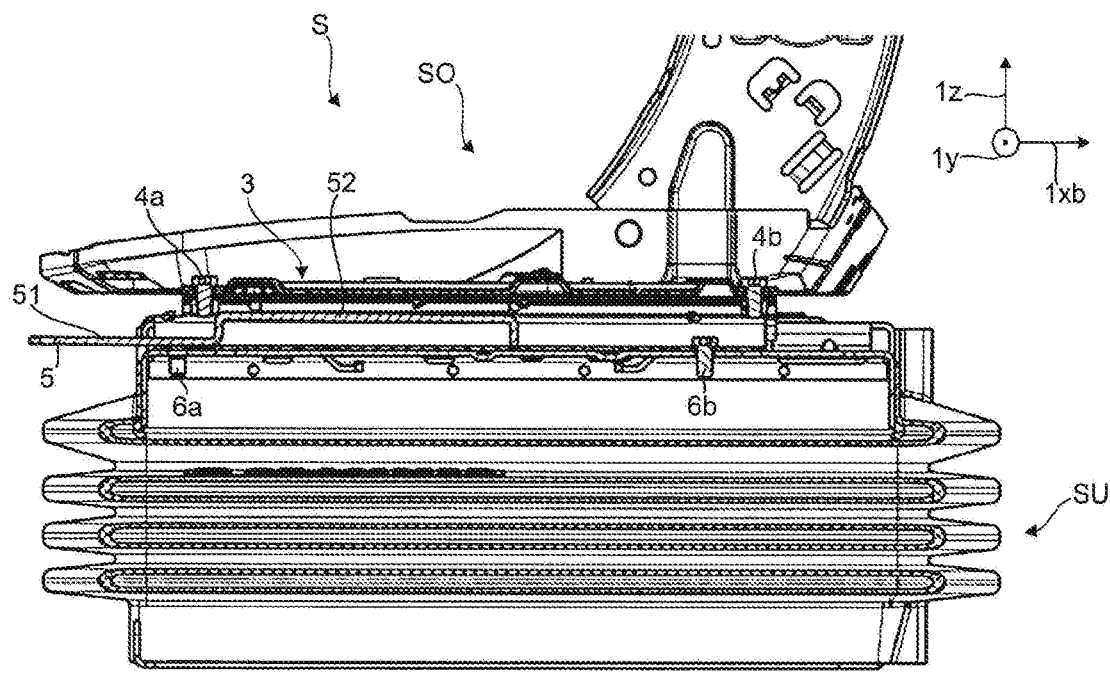
Figure 3C:
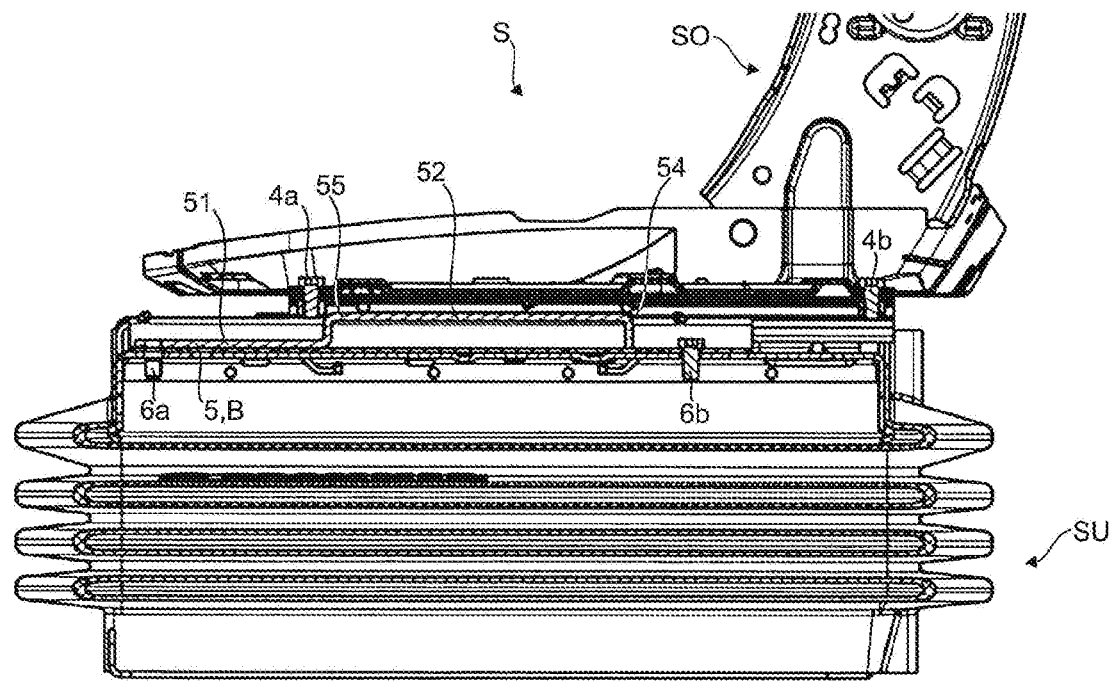

In the present case, the longitudinal adjustment direction 1x of the guide device 1 can be a direction towards the front 1xa and a direction towards the rear 1xb. There is at least a first installation state A and at least a second installation state B of the component 5. Thus, FIG. 2a-c show the first installation state A, according to which the first section 51 of the component 5 is arranged in front of the second section 52 with respect to the longitudinal adjustment direction 1x towards the front lax. FIG. 3a-c also show the second installation state B, according to which the first section 51 of the component 5 is arranged behind the second section 52 with respect to the longitudinal adjustment direction 1x towards the front lax.

FIG. 3a-c show different steps in chronological order of threading the component 5 into the rest of the guide device 1, so that the component 5 is installed according to a second installation state B.

According to FIG. 3a, a first step of threading can be seen. Accordingly, the slide rail device 3 and with it the upper seat part SO is displaced to a maximum extent forwards 1xa relative to the guide rail device 2 and the lower seat part SU. This ensures that the front stop element 4a of the slide rail device 3 does not collide with the component 5 during threading of the component 5. The component 5 is now pushed from the front seat side in the longitudinal direction to the rear 1xb with the second section 52 first into the installation space 9.

According to FIG. 3c, the component 5 has already reached its intended position within the rest of the guide device 1. The slide rail device 3 is now moved towards the rear 1xb, so that the access to the fastening element 6a of the guide rail device 2 necessary for fastening the component 5 within the rest of the guide device 1 is ensured. By means of the fastening element 6a (of which parts, namely the screw of the fastening element 6a, are hidden; only the bore of the fastening element 6a is shown) and the connection element 53, the component 5 is fastened to the lower seat part SU via the guide rail device 2.

In the present case, the stop elements 4a, 4b of the slide rail device 3 which can interact with the stop elements 54, 55 of the component 5, are likewise part of the standard guide rail and, for example, as part of screw connections, in the present case as hexagon nuts. In the present case, these screw connections are provided for connecting the slide rail device 3 to an upper part to be moved, in this case the upper seat part SO.

In the present case, the stop elements 4a, 4b of the slide rail device 3 are designed as mechanical stop elements which project into an installation space 9 (see FIG. 5b), which in the present case is designed as an intermediate space between the slide rail element 30 of the slide rail device 3 and a guide rail element 20 of the guide rail device 2.

In the present case, the component 5 comprises precisely one first section 51 and precisely one second section 52 and is otherwise free of further sections.

Figure 1A:
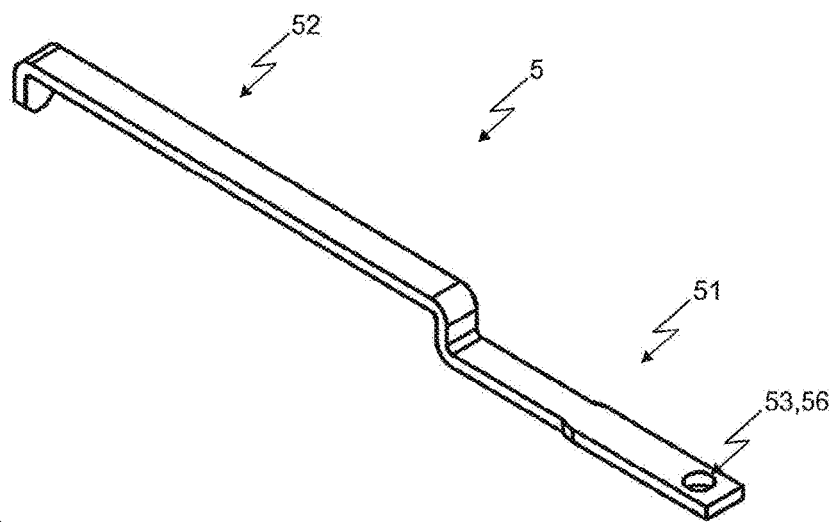
FIG. 1a-c show schematically several views of a component for insertion in a guide device according to a first embodiment.
Figure 1B:
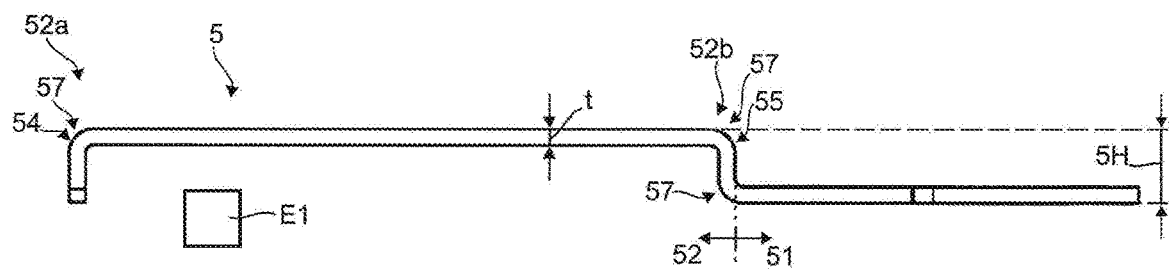
Figure 1C:
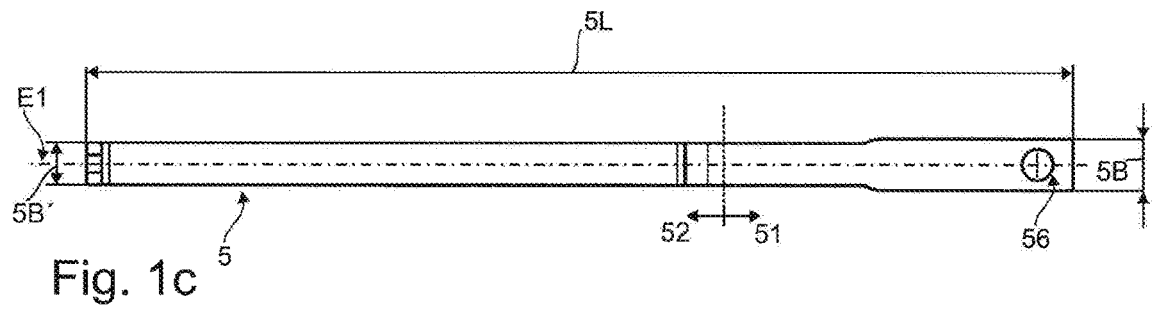
Figure 1D:
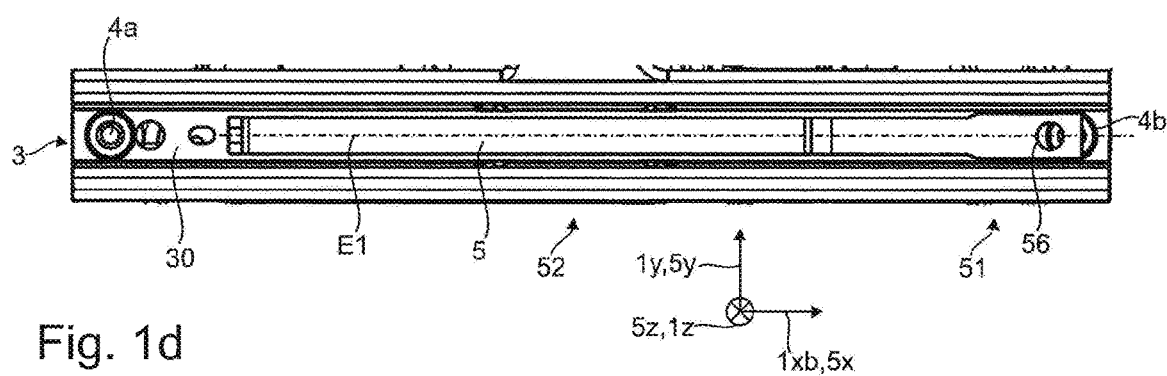
FIG. 1d shows schematically a view of a guide device according to the invention with inserted component.

FIGS. 1b, 1c and 1d also show that the component 5 in the present case has exactly one mirror symmetry plane E1, which is arranged parallel to the longitudinal direction 1x of the guide device 1. In the present case, a longitudinal direction 5x of the component 5 is arranged parallel to the longitudinal direction 1x of the guide device 1. The same applies here to a width direction 5y of the component 5 with respect to the width direction 1y of the guide device 1 and to a height direction 5z of the component 5 with respect to the height direction 1z of the guide device 1.

It is also shown that the component 5 has a homogeneous thickness t over its entire length 5L and width 5B. In the present case, the length 5L of the component 5 extends in the longitudinal direction 5x of the component 5. In the present case, the width 5B of the component 5 extends in the width direction 5y of the component 5. In the present case, the thickness t of the component 5 extends at least in sections in the height direction 5z of the component 5.

It is shown that the first section 51 of the component 5 is linear when seen in the longitudinal direction 5x, 1x. Furthermore, it is shown that the second section 52 of the component 5, which in the present case is arranged directly adjacent to the first section 51, has a U shape, which is designed with respect to the longitudinal direction 5x of the component 5.

In the present case, the second section 52 has a total of three rounded portions 57, which form the corners of the U-shape. One of the rounded portions 57 is arranged directly adjacent to the first section 51 and forms the connection point to the first section 51.

In the present case, a rounded portion 57 forms a stop element 54 or 55 of the second section 52 of the component 5.

In the present case, the component 5 is designed as a sheet metal part, the manufacture of which in terms of shape only comprises the production of the blank from a metal sheet and the folding of the blank. Afterwards, surface-treating or finishing steps such as galvanizing or powder coating are possible.

In the present case, the component 5 has only four tabs which are folded to one another as production elements. The component 5 is thus free of further production elements such as folds, envelopes, standing seams, beads, gills, threaded holes, welds and/or deep-drawn bodies. In the present case, the component 5, apart from the recess 56 in the first section 51, is otherwise free of further recesses.

In the present case, the width 5B of the component 5 is designed such that it changes over its length 5L and its height 5H changes only in the first section 51; in the present case from the maximum width 5B to the reduced width 5B'. It is thus shown that the component 5 in the first section 51 has a width 5B, 5B' which tapers in the direction of the second section 52. In the present case, the recess 56 is arranged in a wider part of the first section 51 and not in the narrower part of the first section 51. It is also shown that the component 5 in the second section 52 has a homogeneous width 5B'.

According to FIGS. 2b, 2c, 3b and 3c, it is also shown that the component 5 is designed to make direct contact with a guide rail element 20 of the guide rail device 2 and is spaced apart from a slide rail element 30 of the slide rail device 3. In the present case, the stop elements 4a, 4b of the slide rail device 3 are the only elements of the guide device 1 with which the stop elements 54, 55 of the component 5 interact when the slide rail device 3 is adjusted relative to the guide rail device 2.

FIG. 2c shows, for example, a state shortly before the first stop state, according to which the first stop element 4a of the slide rail device 3 comes to a stop with the first stop element 54 of the component 5, that is to say it interacts mechanically. FIG. 2b shows, for example, a second stop state, according to which the second stop element 4b of the slide rail device 3 comes to a stop with the second stop element 55 of the component 5, that is to say it interacts mechanically.

It shall be understood that the embodiment described above is only a first configuration of the guide device according to the invention. In this respect, the configuration of the invention is not limited to this embodiment.

All the features disclosed in the application documents are claimed as being essential to the invention, provided that, individually or in combination, they are novel over the prior art.

LIST OF REFERENCE SIGNS 1 guide device
1x, 5x, Sx longitudinal direction
1xa direction towards the front
1xb direction towards the rear
1y, 5y, Sy width direction
1z, 5z, Sz height direction
2 guide rail device
3 slide rail device
4a, 4b, 54, 55 stop element
5 component
5B, 5B' width
5H height
5L length
6a, 6b fastening element
7a, 7b, 8a, 8b standard stop elements
9 installation space
20 guide rail element
21, 31 end face
30 slide rail element
51, 52 section
52a, 52b end
53 connection element
56 recess
A, B installation state
E1 mirror symmetry plane
S vehicle seat
SO upper part
SU lower part
t thickness

The invention claimed is:

1. A guide device for guiding an adjustment movement of a vehicle seat, comprising:
a guide rail device and a slide rail device arranged displaceably thereto in a longitudinal adjustment direction of the guide device, the slide rail device having a first stop element and a second stop element, wherein a one-piece component is disposed between the slide rail device and the guide rail device, wherein the component is divided in the longitudinal direction of the guide device into a first section and a second section, wherein at least one connection element disposed in the first section fixedly connects the component to the guide rail device, and wherein the second section of the component at a first end forms a first stop element for one of the stop elements of the slide rail device and at a second end forms a second stop element for the other of the stop elements of the slide rail device to respectively stop the slide rail device from moving in a first direction and a second direction.

2. The guide device according to claim 1, wherein the component has exactly one mirror symmetry plane which is arranged parallel to the longitudinal direction of the guide device.

3. The guide device according to claim 2, wherein the component has a homogenous thickness over at least one of an entire length and width of the component, wherein the first section of the component as seen in the longitudinal direction is linear, and wherein the second section of the component has a U shape.

4. The guide device according to claim 3, wherein the longitudinal adjustment direction of the guide device is at least one of a direction towards a front or a direction towards a rear, wherein there is at least a first and at least a second installation state of the component, and wherein according to the first installation state with respect to the longitudinal adjustment direction towards the front the first section of the component is arranged in front of the second section, and according to the second installation state with respect to the longitudinal adjustment direction to the front the first section of the component is arranged behind the second section.

5. The guide device according to claim 4, wherein the component in the first section comprises one or more recesses, and wherein the one or more recesses connects the component to at least one fastening element of the guide rail device.

6. The guide device according to claim 1, wherein the component has a homogeneous thickness over at least one of an entire length and width of the component, wherein the first section of the component as seen in the longitudinal direction is linear, and wherein the second section of the component has a U shape.

7. The guide device according to claim 6, wherein the second section of the component is disposed directly adjacent to the first section of the component.

8. The guide device according to claim 1, wherein the longitudinal adjustment direction of the guide device is at least one of a direction towards a front or a direction towards a rear, wherein there is at least a first and at least a second installation state of the component, and wherein according to the first installation state with respect to the longitudinal adjustment direction towards the front the first section of the component is arranged in front of the second section, and according to the second installation state with respect to the longitudinal adjustment direction to the front the first section of the component is arranged behind the second section.

9. The guide device according to claim 1, wherein the component in the first section has one or more recesses, and wherein the one or more recesses connects the component to at least one fastening element of the guide rail device.

10. The guide device according to claim 1, wherein at least one of the component in the first section has a width that tapers towards the second section or the component has a homogeneous width in the second section.

11. The guide device according to claim 1, wherein the longitudinal adjustment direction of the guide device is arranged parallel to a longitudinal direction of the vehicle seat, wherein the guide rail device is firmly connected to a lower part of the vehicle seat and wherein the slide rail device is firmly connected to an upper part of the vehicle seat.

12. The guide device according to claim 1, wherein the first stop element of the slide rail device is spaced a first distance from the second stop element of the slide rail device in the longitudinal direction of the guide device.

13. The guide device according to claim 12, wherein the first stop element of the component and the second stop element of the component are disposed between the first stop element of the slide rail device and the second stop element of the slide rail device.

14. The guide device according to claim 1, wherein at least one of the first section of the component and the second section of the component is linear.

15. The guide device according to claim 1, wherein the second section of the component is disposed above the first section of the component in a height direction.

16. A guide device for guiding an adjustment movement of a vehicle seat, the guide device comprising:
a guide rail device and a slide rail device arranged displaceably thereto in a longitudinal direction of the guide device, the slide device having a first stop element and a second stop element, and a one-piece component that is disposed between the slide rail device and the guide rail device, wherein the component is divided in the longitudinal direction of the guide device into a first section and a second section, wherein at least one connection element disposed in the first section fixedly connects the component to the guide rail device, wherein the second section of the component at a first end forms a first stop element for one of the stop elements of the slide rail device and at a second end forms a second stop element for the other of the stop elements of the slide rail device, and wherein the component is formed in direct contact with a guide rail element of the guide rail device and is spaced apart from a slide rail element of the slide rail device.

17. The guide device according to claim 16, wherein the first stop element of the slide rail device is spaced a first distance from the second stop element of the slide rail device in the longitudinal direction of the guide device.

18. The guide device according to claim 17, wherein the first stop element of the component and the second stop element of the component are disposed between the first stop element of the slide rail device and the second stop element of the slide rail device.

19. The guide device according to claim 16, wherein at least one of the first section of the component and the second section of the component is linear.

20. The guide device according to claim 16, wherein the second section of the component is disposed above the first section of the component in a height direction.

* * * * *

UNITED STATES PATENT AND TRADEMARK OFFICE
CERTIFICATE OF CORRECTION

PATENT NO. : 11,110,824 B2
APPLICATION NO. : 16/797413
DATED : September 7, 2021
INVENTOR(S) : Joachim Pelka It is certified that error appears in the above-identified patent and that said Letters Patent is hereby corrected as shown below:

In the Claims

In Claim 11, Column 12, Line 59, delete "lower part of the vehicle seat and wherein" and insert --lower part of the vehicle seat, and wherein-- therefore.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*